INVENTORS
ROBERT A. BRENNER
ERNEST B. RUBLE

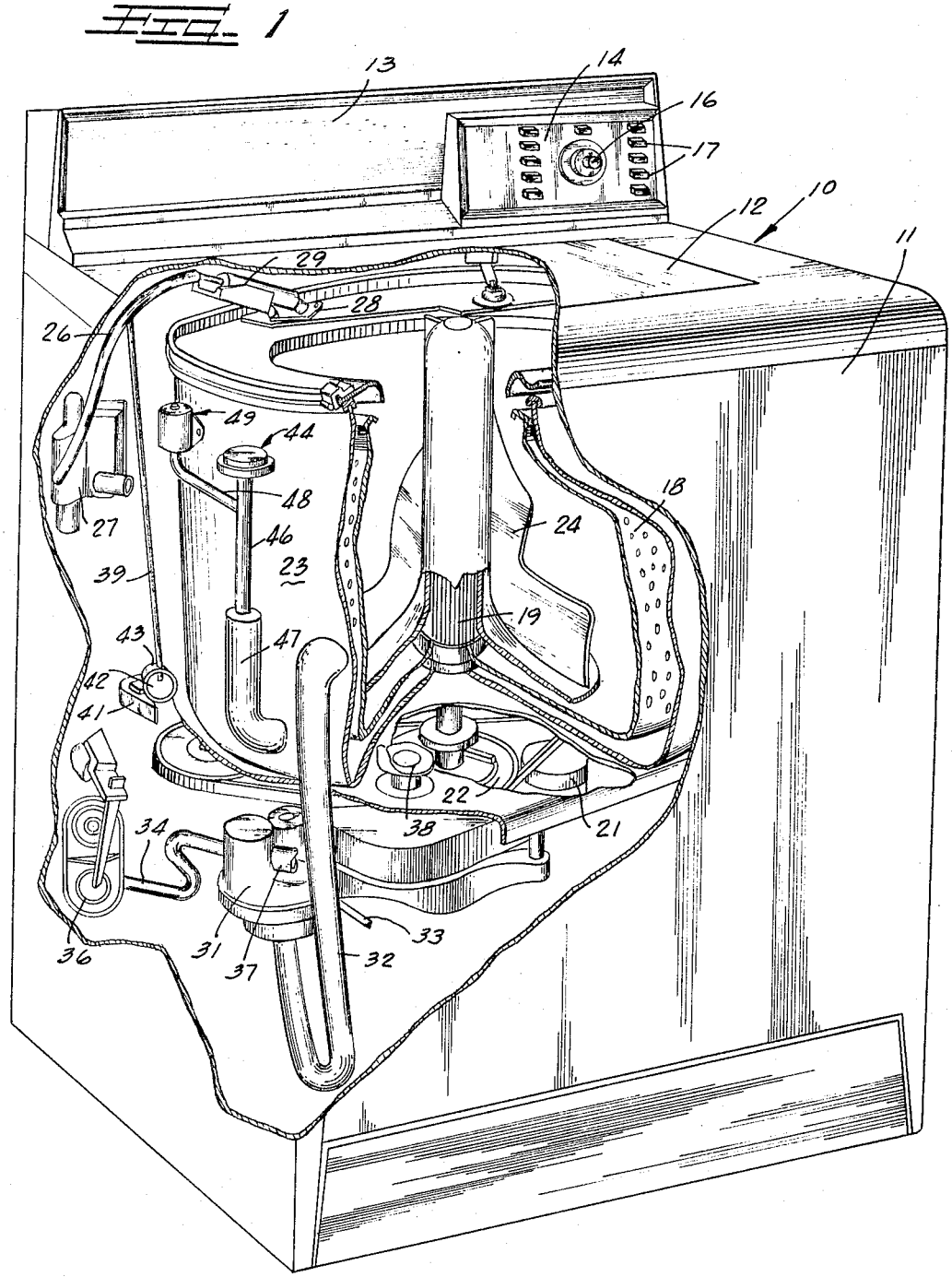

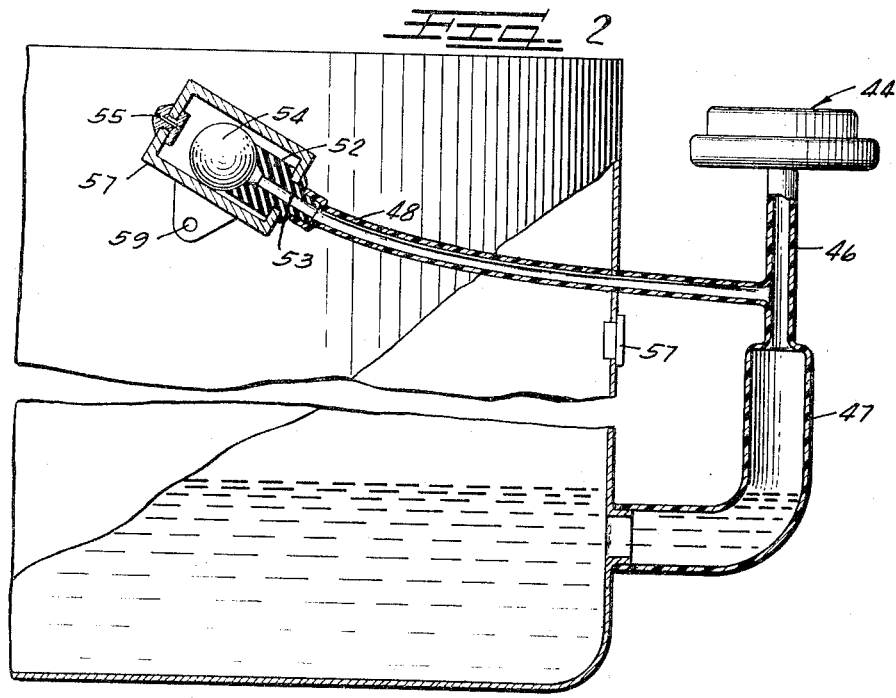
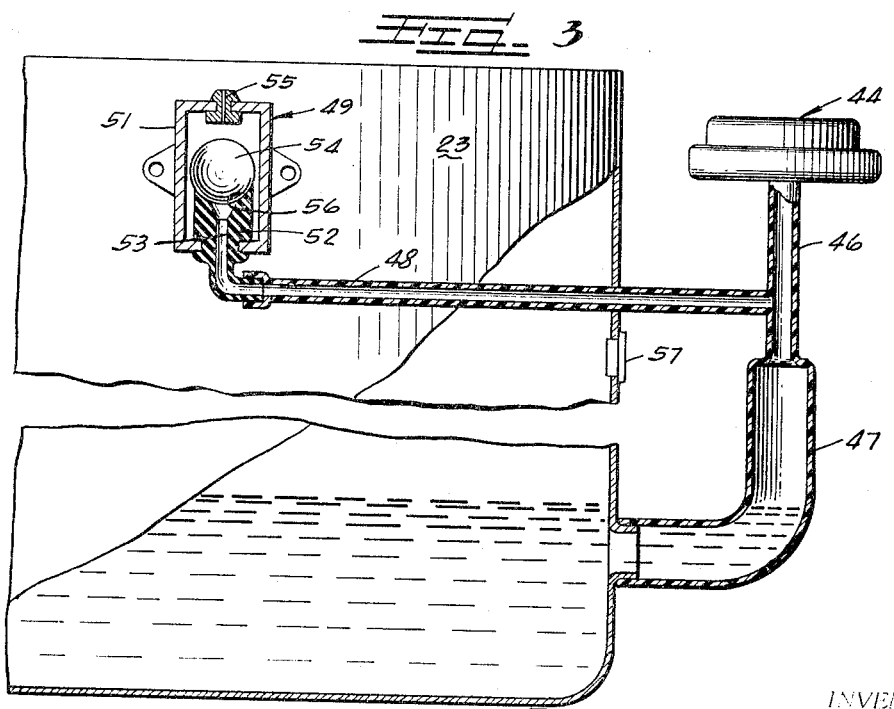

BY Hill, Sherman, Meroni, Gross & Simpson
ATTORNEYS

United States Patent Office 3,316,569
Patented May 2, 1967

3,316,569
TORQUE RESPONSIVE PNEUMATICALLY OPERATED WATER LEVEL CONTROL FOR AUTOMATIC WASHER
Robert A. Brenner and Ernest B. Ruble, St. Joseph, Mich., assignors to Whirlpool Corporation, Benton Harbor, Mich., a corporation of Delaware
Filed Oct. 20, 1965, Ser. No. 498,493
11 Claims. (Cl. 8—158)

The present invention relates to a torque responsive pneumatically operated water level control system for automatic washing machines. The invention is specifically directed to a system for maintaining the proper balance or relationship between the amount of laundry liquid used in relation to the wash load.

It has been proposed that laundry machines use a torque responsive system and utilize the torque transmitted from the agitator to the tub to energize the water control system and introduce an appropriate amount of liquid into the tub for washing purposes. Such a system has been described in Cobb and Williams U.S. Patent No. 3,065,618, assigned to the same assignee as the present application. The system of the Cobb et al. patent operates on the principal that the wash liquid is incapable of transmitting significant amounts of torque because water will not support shear forces. When a given load is supplied with insufficient amounts of water, torque from the agitator will be transmitted through the load to the basket and the tank. As the agitator oscillates, the torque transmitted through the load to the basket and tank produces corresponding movement of the basket and tank which is detected by a motion sensing means, such as a vibrationally responsive mercury switch.

The signal derived from this torque sensitive means then controls the fluid entry means of the laundry machine to introduce more water and thereby reduce the transmitted torque. Thus, the torque signal is utilized to afford a highly accurate control of the optimum amount of water in the tank regardless of the load size or the types of fabric introduced into the load make-up.

An improvement of the type of system described above forms the basis of Davenport and Woodfin U.S. Patent No. 3,030,790 also owned by the assignee of the present invention. In the preferred form of the invention shown in that patent, there is an electrically energized heater in series with the torque sensing switch and a switch responsive to the temperature of the heater to control the introduction of liquid into the tank.

The present invention is directed to a washing machine assembly in which the filling of the tub is controlled by pneumatically actuable means, and in which there is provided a motion sensitive water level control having an air bleed off which controls operation of the pneumatic system for introducing washing liquid into the machine.

One of the objects of the present invention is to provide an automatic washing machine having a pneumatically operated water level control equipped with an air bleed off means responsive to torque produced movement for releasing air trapped in the pneumatic control, to thereby reset the pneumatic control for introduction of a further amount of washing liquid.

Another object of the invention is to provide an air bleed off means for pneumatically controlling an inlet valve for automatic washing machines which does not require complicated electrical circuitry or cumbersome mechanical installations.

Still another object of the invention is to provide an air bleed off means for an automatic washing machine and the like which is economical in construction and rugged in use.

Other objects and features of the invention will become apparent from the following description of the attached sheets of drawings in which:

FIGURE 1 is a perspective view of a washing machine with which the control system of the present invention may be utilized, and which is broken away to afford a view of the operating parts thereof;

FIGURE 2 is a fragmentary view partially in elevation and partly in cross-section illustrating a form of bleed off means which can be used in accordance with the present invention;

FIGURE 3 is a view similar to FIGURE 2, but illustrating a different form of the invention;

As shown in the drawings:

Figure 4:
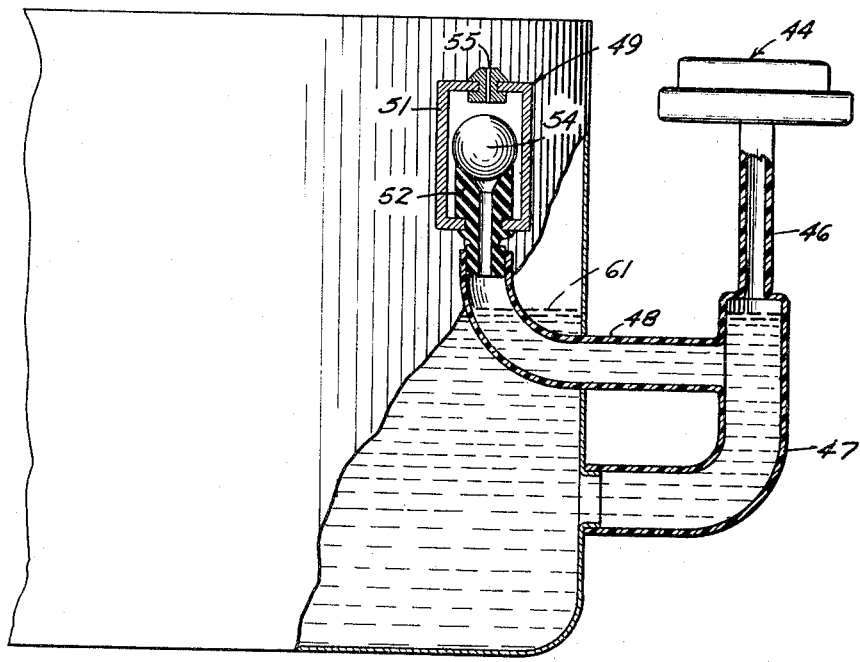
FIGURE 4 is a view similar to FIGURE 2 and 3 but illustrating still another modified form.
Figure 5:
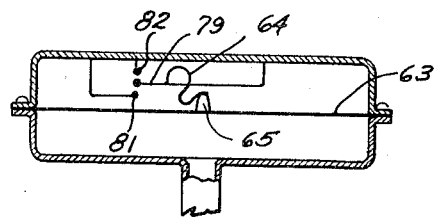
FIGURE 5 is a diagrammatic sectional view of a pressure switch which may be used in the invention.

While the system of the present invention can be applied to various types of washing machines employing, for example, diverse types of agitators, the particular machine illustrated in the drawings utilizes an oscillatory type agitator mounted on a vertical axis. In FIGURE 1, reference numeral 10 indicates generally the washing machine including a cabinet 11 provided with a lid 12 and a back 13. On the back 13 there is mounted a control panel 14 having a control knob 16 and control buttons 17 for selectively operating the machine automatically through a programmed schedule of washing, rinsing, and extracting operations.

A foraminous basket 18 is mounted on a spin tube 19 and is driven at an extraction or spin speed by a drive motor 21 controlled by a drive and brake mechanism 22. The basket 18 is mounted in an outer tub or tank 23 and clothes contained within the machine are agitated by an agitator 24. Liquid is delivered into the machine by means of a hose 26 which communicates with a mixing valve 27 and a water inlet 28 for introducing water into the basket and tub. If desired, an air gap vacuum break 29 may also be provided. The washing machine 10 is provided with a unidirectional pump 31 consisting of a separate lower recirculation portion and a separate upper pump out and suds return portion. Both pump portions operate whenever the drive motor 22 is energized. Whenever there is water in the tub 23 and the drive motor 21 is energized, the recirculation portion serves to discharge water from the tub 23 through a hose 32 and into a hose 33. The latter is connected to a filter (not shown) that discharges filtered water back into the tub 23. An agitation solenoid, in addition to controlling the mechanical movement of the agitator 24, also controls the direction of water flow through a hose 34 leading from the pump 31 to a two way valve 36 and a hose 37 leading from the pump 31 to an outlet 38 in the tub 23. The two way valve 36 is provided to control a suds saving and return feature. If this suds saving feature is not desired, the two way valve 36 is eliminated and the hose 34 is connected directly to a drain. During the wash cycle, the agitation solenoid is energized and the pump is conditioned to pump in the direction from hose 34 to hose 37 and thus acts to hold the water in the tub. At the end of the wash cycle, the agitation solenoid is deenergized and the pump 31 is conditioned to withdraw water from the tub 23 through the outlet 38, through hose 37 to hose 34, and to the two way valve 36, if used.

In the type of washing machine shown in FIGURE 1, the tub 23 is mounted by means of a three-point ball and rod suspension system, a rod 39 being pivotally connected to a base plate 41 for the tub by means of a ball 42 located in a socket 43.

The pressure sensitive pneumatic means for controlling introduction of water into the tub is indicated generally at reference numeral 44 in FIGURE 1. This switch is a commercially available unit consisting of a single pole, double throw switch actuated by a diaphragm. The switch is of the over-center type and of the snap-acting type wherein the switch arm is rapidly movable from one position to the other. As will hereinafter become apparent, in one position of the switch, it actuates the filling means, while in the other controls operation of the agitator means.

The switch comprises a diaphragm 63, two stationary contacts 81 and 82, a movable contact arm 79 and a snap acting spring 64 for actuating the movable contact arm 79 between contacts 81 and 82. Spring 64 is attached at one end to arm 79 and at its other end to a finger 65 on diaphragm 63. Movement of the diaphragm 63 is effective to move spring 64 between alternate over center positions which causes the spring to snap the arm 79 between contacts 81 and 82 depending upon the position of diaphragm 63.

The pressure switch 44 is connected by means of a plastic tube 46 and an elbow hose 47 into fluid communication with the liquid contained in the tub 23. As best seen in FIGURE 3, the plastic tube 46 is connected by means of a tube 48 to a motion responsive unit 49 connected to the tub 23. The motion responsive unit 49 includes an outer housing 51 in which there is a resilient rubber seat 52. The seat 52 includes an axially disposed port 53 for communicating with the air bleed line 48. The housing 51 is also provided with a vent 55 for equalizing the pressure in the housing 51 with the ambient pressure. A steel ball 54 is received in a ball seating face 56 and closes off the port 53 during normal operation.

With the type of device shown in FIGURES 1 and 3, the automatic washer 10 is charged with washing liquid to an initial minimum level prior to initiation of agitation. The pressure switch 44 controls the initial fill in the normal manner. After the tub is filled to the desired level, agitation commences. As the agitator 24 oscillates, forces are exerted by the agitator on the materials being washed and the wash liquid causing movement of the basket 18, tub 23, base plate 41 and other suspended elements of the washer. The resistance encountered by the agitator decreases as the amount of washing liquid increases, and as the resistance decreases the torque produced movement of the suspended elements of the washer decreases. The movement is herein referred to as torque produced since it is primarily caused by forces generated as a result of oscillation of the agitator. It is, however, contemplated that motion indicative of the relationship between wash loads and wash liquid, regardless of the forces producing such motion, may be utilized by the apparatus of the invention.

As the tub 23 is being filled, air trapped in the plastic tube 46 is compressed and ultimately the pressure in the tube is sufficient to actuate the switch 44, thereby commencing the agitation cycle. If the torque transmitted to the torque responsive means 49 is sufficiently high, due to a lower than required ratio of washing liquid to wash load, the ball 54 is rocked off its seat, thereby permitting air to be bled from the plastic tube 46 through the air bleed line 48 and through the port 53. The ball 54 is rocked off its seat when the inertia of the ball induced by motion of the container exceeds a predetermined amount. The steel ball 54 is restrained from falling completely off the seat 56 by the housing 51. With the bleed off of the air, the pressure switch 44 is reset and additional amounts of washing liquid are introduced into the tub 23 until pressure switch 44 again switches to its agitate position. If, after the second charge of washing liquid, the torque produced movement is not decreased to the point which allows the ball 54 to remain seated on the seat 56, an additional amount of air will be bled off through the line 48, and pressure switch 44 again will be reset to allow a third charge of washing liquid to enter the tub.

In the form of the invention shown in FIGURE 3, a maximum water level control is provided by means of a top water level control switch 57 mounted in the tub 23. The switch 57 may be of the pressure sensitive type or, other suitable type such as a float switch. When the level of the washing liquid in the tub 23 reaches the height determined by the position of the switch 57, the filling circuit is deenergized and no further washing liquid is introduced into the tub 23. In this form of the invention, the air bleed line 48 is joined to the plastic tube 46 at a position above the maximum water level intended, so that the maximum level is under the control of the switch 57.

The form of the invention illustrated in FIGURE 2 of the drawings is very similar to that shown in FIGURE 3, and corresponding numbers have been placed on the elements in both structures. In this form of the invention, however, the housing 51 is mounted on an adjustable pivot 59. When there is a proper amount of washing liquid in relation to the amount of wash load, only a small amount of torque is transferred from the agitator to the basket and tub. When the ratio of washing liquid to load is decreased below a predetermined amount, the ball 54 is tipped with relation to the seat 52, thereby bleeding off the air from the tube 46 by means of the air bleed line 48. Eventually, the pressure switch 44 is actuated into the fill position, so that more washing liquid is introduced into the tub. This sequence continues until the proper amount of water is in the tub. The sensitivity of the device can be varied by pivoting the housing 51 about the pivot 59 so that greater or lesser amounts of torque produced movement will be effective to unseat the ball 54 and thereby effect operation of the pressure switch 44.

The form of the invention shown in FIGURE 4 of the drawings is very similar to that shown in FIGURE 3, except for the fact that the upper limit switch 57 is eliminated. Instead, the air bleed line 48 is connected to the elbow 47 at a level below the level, indicated at the dashed line 61, which is the predetermined upper limit for the liquid level in the tub. Consequently, when the water from the tub fills the elbow 47, it closes off the air bleed line 48 so that the air pressure in the plastic tube 46 cannot be relieved by venting, and the filling of the tub is solely under the control of the pressure switch 44 when the water rises above the level of the bleed line 48.

In all of the above described embodiments of the invention it is preferred that the port 53 be of restricted size so as to permit only the slow release of air from bleed line 48. Thus numerous unseatings of the ball 54 are necessary before pressure switch 44 resets to allow additional fill water to enter the tub 23. Also the pressure switch 44 may be adjusted so that a small differential in pressure will effect the actuation of the switch between its two positions. This allows the addition of many small quantities of fill water as opposed to a few large quantities.

Figure 7:
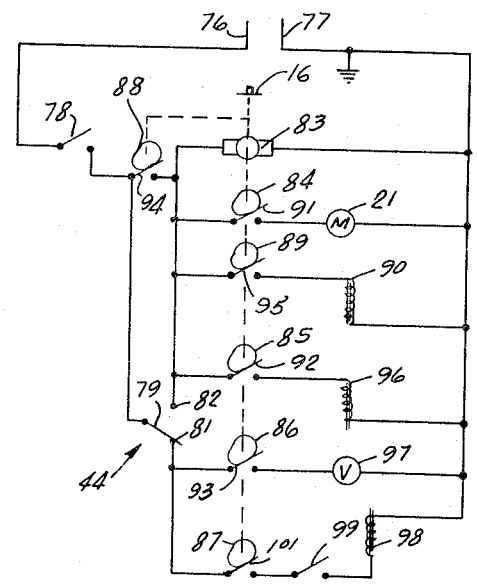
FIGURE 7 is a circuit diagram of a control system which can be employed in accordance with the present invention.

A typical wiring diagram for the system of the present invention is shown in FIGURE 7 of the drawings. Energization of the system is derived through a pair of leads 76 and 77 from a suitable power source. Closing a main on-off switch 78 puts the circuit in readiness for succeeding operations. When the control knob 16 is moved to the "fill" position, water is introduced into the tub to a level determined by the pressure responsive switch 44. When the water level is sufficiently high in the machine to actuate the pressure sensitive switch 44, the switch arm 79 moves from engagement with a contact 81 into engagement with an upper contact 82 and thereby applies the energizing voltage across a timer motor 83. The timer motor is of the usual type, employing a shaft with a plurality of cams 84, 85, 86, 87, 88 and 89. As soon as the timer motor 83 starts to operate, the cams 84 and 85 operate to close their associated switches 91 and 92 respectively. The closing of switch 91 applies energizing voltage across the drive motor 21. Closing of the switch 92 energizes the agitator solenoid 96 so that oscillatory motion of the agitator 24 begins. The switch 93 was closed by movement of control knob 16 to the "fill" position.

The machine is now conditioned to sense whether the initial fill was sufficient to carry out a washing operation. As previously described, if the amount of washing liquid is insufficient, air will be bled from the pressure switch, and switch arm 79 will be reset in contact with contact 81. This movement of contact arm 79 opens the circuit to the timer motor, machine motor and agitate solenoid and again closes the circuit to the fill valve 97. Thus the machine is idle while an additional amount of washing liquid is added to the machine. Actuation of the arm 79 back to contact 82 again conditions the machine to sense the sufficiency of the wash bath.

After five timer increments, the cam 88 is effective to close switch 94 which provides a by-pass circuit to the timer motor. When the switch 94 is closed the machine will remain in operation regardless of the position of switch arm 79.

Figure 6:
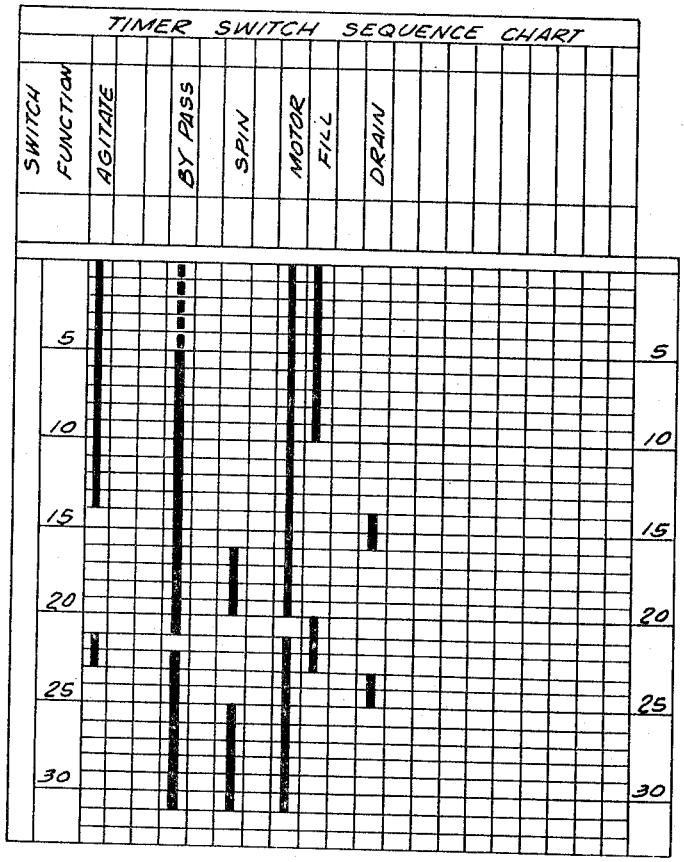
FIGURE 6 is a timer schedule illustrating an integrated system for controlling the energization of various electrical circuits involved in the present invention.

It is also possible to operate the apparatus of the present invention in an integrating manner by closing the by-pass switch 94 at the completion of the initial fill as indicated by a dashed line in the sequence chart of FIGURE 6. In this form of the invention, when the timer motor is energized by obtaining a predetermined level of liquid in the tub, the agitator solenoid 96 is energized immediately, along with the by-pass switch 94 and the switch 91.

With the switch 94 closed the machine does not idle during fill periods subsequent to the initial fill and thus a continuous sensing of liquid level is obtained. Also, with switch 94 closed the movement of switch arm 79 to contact 82 does not affect machine operation other than to terminate fill.

In operation, if the amount of wash liquid is insufficient, the pressure switch 44 resets to provide additional wash liquid. However, resetting the pressure switch does not interrupt machine operation as before, so that now the air bleed means is continuously effective to bleed off air if the water level is insufficient. This continuous air bleed system has the effect of integrating the incremental fill periods previously described.

At the conclusion of the wash portion of the machine cycle, herein the end of increment 14, the drain solenoid 90 is actuated by cam 89 closing switch 95. This effects the draining of wash liquid from the machine which in turn cause pressure switch 44 to reset to its fill position with switch arm 79 in contact with contact 81. Since the timer cam 86 had opened switch 93 at the end of the tenth timer increment no fill liquid will be added at this time. However the pressure switch now performs an auxiliary function of providing a circuit to the spin solenoid 98 through lid switch 99 and timer switch 101 which will be closed by cam 87 at the beginning of timer increment 16. When the spin portion of the machine cycle is completed at the end of timer increment 20, the fill switch 93 is again closed by cam 86 and the tub 23 is filled with rinse liquid in the same manner as for wash liquid. Either the incremental or integrating fill systems may be used for rinse liquid and the operation of the machine proceeds as for wash. Following the rinse portion of the machine cycle, second drain and second spin operations are carried out as indicated in the sequence chart of FIGURE 6.

From the foregoing, it will be understood that the system of the present invention provides a control for selectively bleeding off air from a pneumatically operated liquid level control for an automatic washer for the purpose of adjusting the relationship of water and load to an acceptable predetermined value. The control system is inexpensive to install and requires little or no maintenance.

It should be evident that various modifications can be made to the described embodiments without departing from the scope of the present invention.

The embodiments of the invention in which an exclusive property or privilege is claimed are defined as follows:

1. In a washing machine having a container for materials to be washed:
   agitation means for effecting a washing operation of materials placed within said container,
   pneumatic pressure controlled means for introducing wash liquid into said container, said pneumatic pressure controlled means being effective to terminate introduction of wash liquid when said pneumatic pressure controlled means senses a predetermined air pressure,
   sensing means on said machine for sensing movement resulting from the agitation of said materials to be washed in an amount of wash liquid less than that required to establish a predetermined relationship between the materials to be washed and the amount of wash liquid, and
   air bleed means associated with said pneumatic pressure controlled means and responsive to said sensing means for reducing the air pressure sensed by said pneumatic pressure controlled means to thereby allow the introduction of additional wash liquid to said container.

2. In a washing machine having a container for materials to be washed:
   an agitation means for said materials,
   liquid inlet means for introducing washing liquid into said container,
   pressure sensitive means arranged to control operation of said liquid inlet means,
   pressure by-pass means for relieving the pressure existing on said pressure sensitive means and thereby modifying its control of said liquid inlet means, and motion responsive means connected to said pressure by-pass means and responsive to excessive motion in said machine as caused by the agitation of said materials to initiate operation of said pressure by-pass means.

3. The machine of claim 2 in which said pressure sensitive means includes a pressure sensitive switch actuated by an air pressure dependent upon the height of liquid in said container.

4. The machine of claim 2 in which said motion responsive means includes a ball and a ball seating surface, said ball being unseatable with respect to said ball seating surface under conditions of excessive motion of said ball, said ball seating surface being in fluid communication with said pressure by-pass means to thereby vent said pressure by-pass means to the ambient atmosphere.

5. In a washing machine having a container for materials to be washed:
   an agitation means for said materials,
   inlet valve means for introducing washing liquid into said container,
   pressure sensitive means connected to said container including
      a tube having one end in fluid communication with the liquid in said container,
      a pressure sensitive switch closing off the other end of said tube,
      said pressure sensitive switch controlling operation of said inlet valve means, and an air bleed off means connected to said tube intermediate said ends, and a motion sensitive device responsive to excessive torque produced movement of said container for operating said air bleed off means upon the sensing of said excessive torque produced movement.

6. The machine of claim 5 in which said motion sensitive device consists of a ball and a ball seating surface in fluid communication with said air bleed off means.

7. The machine of claim 6 in which said ball seating surface is angularly positionable with respect to a vertical axis passing through said ball.

8. The machine of claim 5 including maximum liquid level control means for precluding introduction of said washing liquid above a predetermined level in said container.

9. The machine of claim 8 wherein said air bleed off means is a conduit and wherein said maximum liquid level control means comprises the connection between said conduit and said tube, said connection being positioned at a point below said predetermined level, whereby washing liquid introduced into said container is free to rise in said tube to a level at which said connection is sealed by said washing liquid thereby precluding further bleed off of air through said conduit.

10. In a washing machine having a container for materials to be washed:
an agitation means for said materials,
inlet valve means for introducing washing liquid into said container,
pressure sensitive means connected to said container including
a tube having one end in fluid communication with the liquid in said container,
a pressure sensitive switch closing off the other end of said tube,
said pressure sensitve switch controlling operation of said inlet valve means, and
an air bleed off means connected to said tube intermediate said ends, and an inertia responsive check valve means sensitive to excessive movement of said container induced by agitation of said materials operable to open said air bleed off means upon sensing said excessive movement.

11. The method of washing articles which comprises introducing the articles to be washed into a container,
introducing washing liquid into said container under the control of pressure responsive means,
terminating the introduction of washing liquid when said pressure responsive means senses a predetermined air pressure.
agitating said articles in said washing liquid, sensing the torque produced movement of said container during such agitating, and
reducing the air pressure sensed by said pressure responsive means when an excessive torque produced movement of said container is sensed, thereby introducing additional washing liquid into said container.

References Cited by the Examiner

UNITED STATES PATENTS

| | | | |
|---|---|---|---|
| 2,899,818 | 8/1959 | Smith et al. | 68—12 X |
| 2,911,811 | 11/1959 | Clark | 68—12 |
| 3,030,790 | 4/1962 | Davenport et al. | 68—13 |
| 3,065,618 | 11/1962 | Cobb et al. | 68—12 |
| 3,269,153 | 8/1966 | Waldrop | 68—12 |

WILLIAM I. PRICE, *Primary Examiner.*